US011553150B2

(12) United States Patent
Dimitrov (10) Patent No.: US 11,553,150 B2
(45) Date of Patent: Jan. 10, 2023

(54) IN PIXEL TIME AMPLIFIER FOR LIDAR APPLICATIONS

(71) Applicant: BAE SYSTEMS Information and Electronic Systems Integration Inc., Nashua, NH (US)

(72) Inventor: Dimitre P Dimitrov, Wayland, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 240 days.

(21) Appl. No.: 16/908,989

(22) Filed: Jun. 23, 2020

(65) Prior Publication Data

US 2021/0400226 A1    Dec. 23, 2021

(51) Int. Cl.
| H04N 5/372 | (2011.01) |
| G01S 7/4865 | (2020.01) |
| G01S 17/89 | (2020.01) |
| G01S 7/486 | (2020.01) |
| G04F 10/00 | (2006.01) |
| G01S 17/894 | (2020.01) |

(52) U.S. Cl.
CPC ....... *H04N 5/37206* (2013.01); *G01S 7/4865* (2013.01); *G01S 7/4868* (2013.01); *G01S 17/89* (2013.01); *G01S 17/894* (2020.01); *G04F 10/00* (2013.01)

(58) Field of Classification Search
None
See application file for complete search history.

(56) References Cited

U.S. PATENT DOCUMENTS

| 9,568,889 B1* | 2/2017 | Lee | G04F 10/04 |
| 9,904,253 B1* | 2/2018 | Hsu | H03L 7/093 |
| 2013/0249627 A1* | 9/2013 | Kwon | H03K 5/1515 330/69 |
| 2020/0182983 A1* | 6/2020 | Calder | G01S 17/89 |
| 2020/0217965 A1* | 7/2020 | Calder | G01S 7/4815 |

OTHER PUBLICATIONS

Agilent Tchnologies, "Fundamentals of Time Interval Measurements", Electronic Counter Series, Jun. 1997, 68 Pages, Application Note 200-3, Hewlett-Packard, USA.
Agilent Tchnologies, "Fundamentals of the Electronic Counters", Electronic Counter Series, Mar. 1997, 44 Pages, Application Note 200, Hewlett-Packard, USA.

* cited by examiner

*Primary Examiner* — Twyler L Haskins
*Assistant Examiner* — Wesley J Chiu
(74) *Attorney, Agent, or Firm* — Maine Cernota & Rardin; Gary McFaline (57) ABSTRACT

Techniques, systems, architectures, and methods for amplifying the time difference between events detected on a focal plane array, allowing greater resolution than that afforded by a reference clock are herein disclosed.

16 Claims, 6 Drawing Sheets

IN PIXEL TIME AMPLIFIER FOR LIDAR APPLICATIONS

FIELD OF THE DISCLOSURE

The following disclosure relates generally to imaging and, more specifically, to increasing time stamp measurement accuracy on focal plane arrays.

BACKGROUND

Digital detection of visual and infrared (IR) images is a very widely used technology, having applications ranging from consumer-oriented cameras and video apparatuses to law enforcement and military equipment. For virtually all of these applications, there is a growing demand for higher image pixel counts, higher pixel density, increased sensitivity, improved dynamic range, lower power consumption, faster image processing, and the ability to switch between modes offering different balances of these characteristics, dependent on the requirements present at a given time. Especially in the special contexts of Unmanned Aerial Vehicles (UAVs) and Man Portable Devices (MPDs), power dissipation of imaging components is fast becoming a very significant concern.

Another area in need of improvement is the time precision with which imaging events are recorded. This is especially true in the special contexts of asynchronous imagers, two dimensional Light Detection and Ranging (LIDAR) systems, flash imaging LIDAR, 3D flash imaging systems, Time-of-Flight (ToF) sensors, and other, similar systems, which utilize pixels that measure and send information concerning the duration during which the pixel was impinged upon by a light source (some also measure the intensity of that light) and/or the time at which the excitation occurred. This information, in the case of LIDAR systems, is used to determine range to a target and also differences in range between targets within the sensor's field of view. More specifically, Lidar measures distance to a target by illuminating the target with laser light and measuring the reflected light with an image sensor. Differences in laser return times can then be used to make digital representations of the target. For this reason, improvements in timing accuracy directly translate to improvements in measurement accuracy.

At the heart of all digital imaging systems, including the aforementioned LIDAR and asynchronous imaging systems, is the Focal Plane Array (FPA), which is a two-dimensional array of elements upon which an image is focused, whereby each of the FPA elements or "pixels" develops an analog output "signal charge" that is, typically, proportional to the intensity of the electromagnetic radiation that is impinging on it after a given interval of time, although some systems exist, such as Geiger Mode Avalanche Photodiode Arrays (GmAPD), that are configured to have a nearly infinite gain, resulting in only a single electron causing a pixel that forms a part of such an array outputting a full-high digital voltage (i.e. the output of the pixel does not have a linear relationship to its input). In either case, this signal charge can then be stored, measured, and used to produce an image or otherwise obtain information regarding an event.

FPAs typically include or are in operative communication with at least one reference clock that serves various purposes within the FPA, one of which is to accurately timestamp and measure the duration over which electromagnetic radiation impinges on a pixel or group thereof.

One existing way to increase the timing precision of a focal plane array is to increase the frequency of the reference clock(s). This solution, however, increases power usage.

Another existing solution involves the use of multiple, relatively-slow reference clocks that are phase shifted from each other. This solution also results in significantly higher power usage while requiring additional circuitry to implement.

Figure 1:
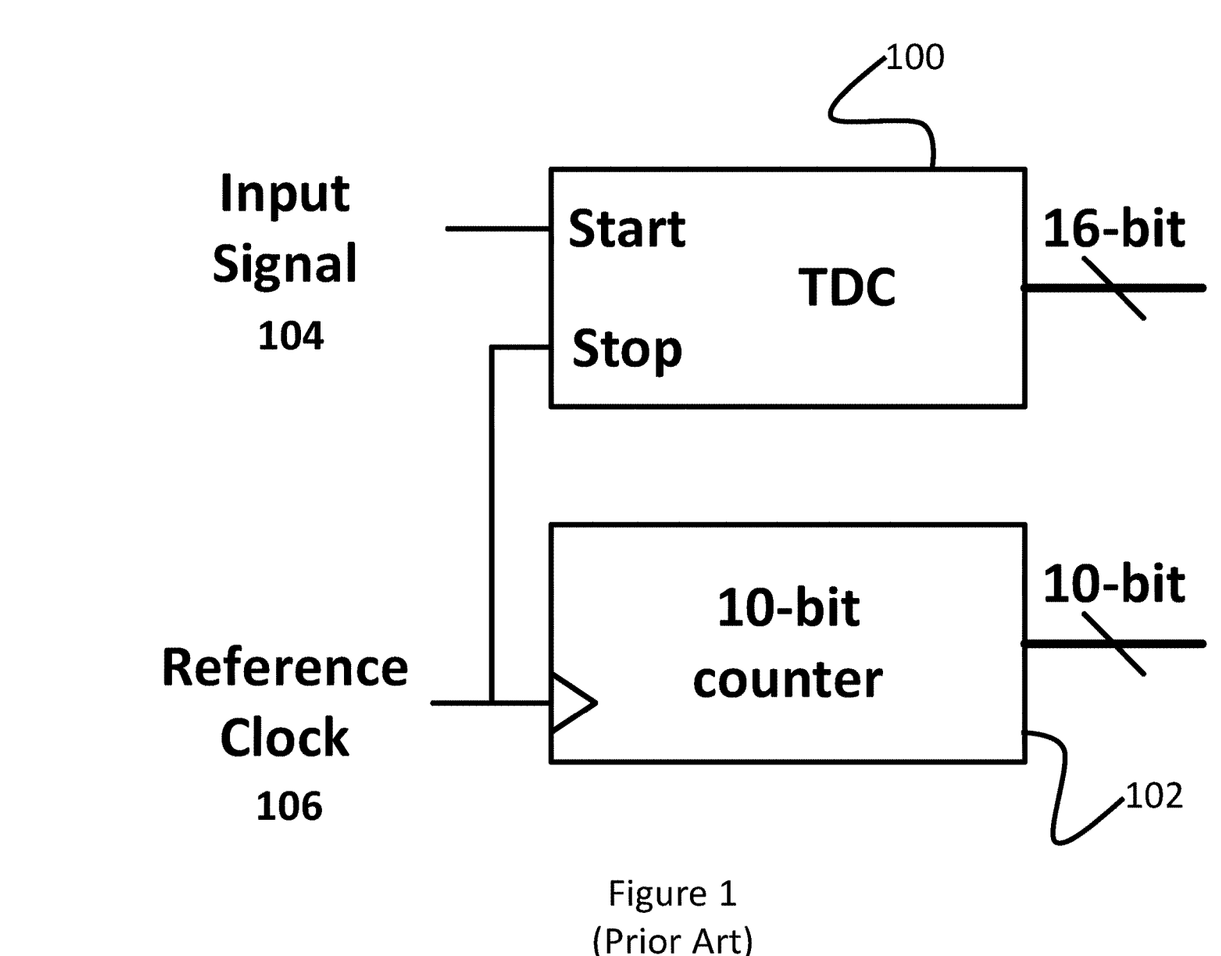
FIG. 1 is a schematic showing a prior art in-pixel time-to-digital converter.
Figure 2:
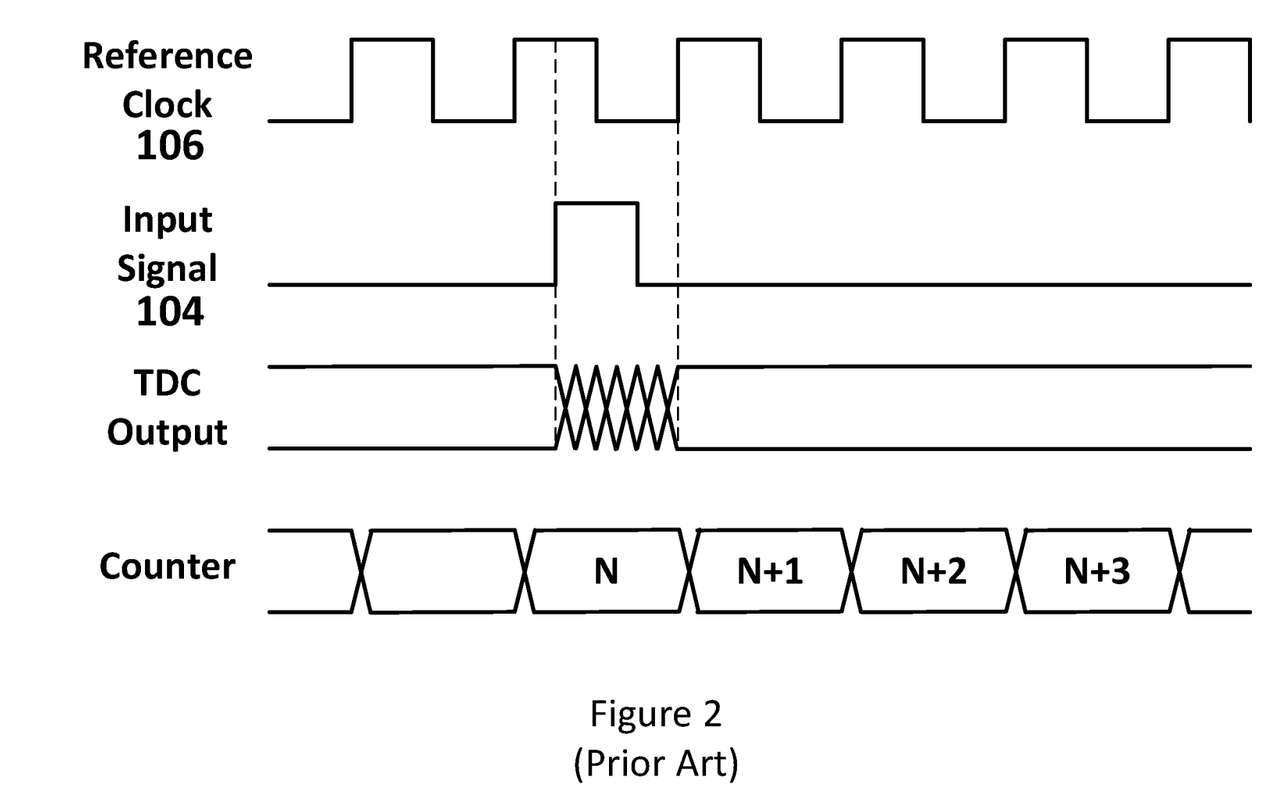
FIG. 2 is a graph describing the behavior of the prior art, in-pixel time-to-digital converter of FIG. 1.

Even another way is to use a Time-to-Digital Converter (TDC) 100, a device for recognizing events and providing a digital representation of the time they occurred that is commonly used to measure a time interval and convert it into digital (binary) output, such as that illustrated in FIG. 1 and whose behavior is illustrated in FIG. 2. TDCs 100, however, require fairly elaborate calibration due to variations caused by design and temperature. This elaborate calibration must be performed over a potentially broad range of temperatures that the system may need to operate in to ensure the accuracy of its measurements over that entire temperature range and increases system complexity as well as bandwidth and memory requirements, which increases power usage.

What is needed, therefore, are systems and methods that increase the precision with which imaging events are recorded without significantly increasing complexity or power usage.

SUMMARY

An exemplary embodiment of the present disclosure provides a system including a Focal Plane Array (FPA) comprising a plurality of pixels, wherein the FPA is configured to use a Time Amplifier (TA), as described herein, to amplify a time difference between an event clock and reference clock, enabling a coarse time and fine time to be determined for an event. Such a configuration allows for extrapolating a finer resolution than the reference clock alone can provide, without a significant increase in power usage.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

With new image sensor technology enabling sensitivity down to single photons and providing, practically speaking, unlimited gain, detection of time resolution down to a fraction of a nanosecond is now possible. Event detection at such a fine resolution requires a very fast clock, or multiple fast clocks.

A Time Amplifier (TA) 300 used on a focal plane array, in accordance with embodiments of the present disclosure, allows event detection at a higher resolution than a reference clock 106 alone, increasing the accuracy of a design or reducing its power requirements (due to the ability to maintain performance while using a slower reference clock 106). The downsides of this technique are that it requires some amount of time following detection of time amplified signals, which is herein referred to as dead time, before a subsequent event can be detected, and that area must be devoted to the TA 300 circuit. For applications where such dead time and additional circuit space can be accommodated, however, embodiments of the present disclosure provide better performance with less complexity and power usage compared to current, high-resolution systems and methods.

Figure 3:
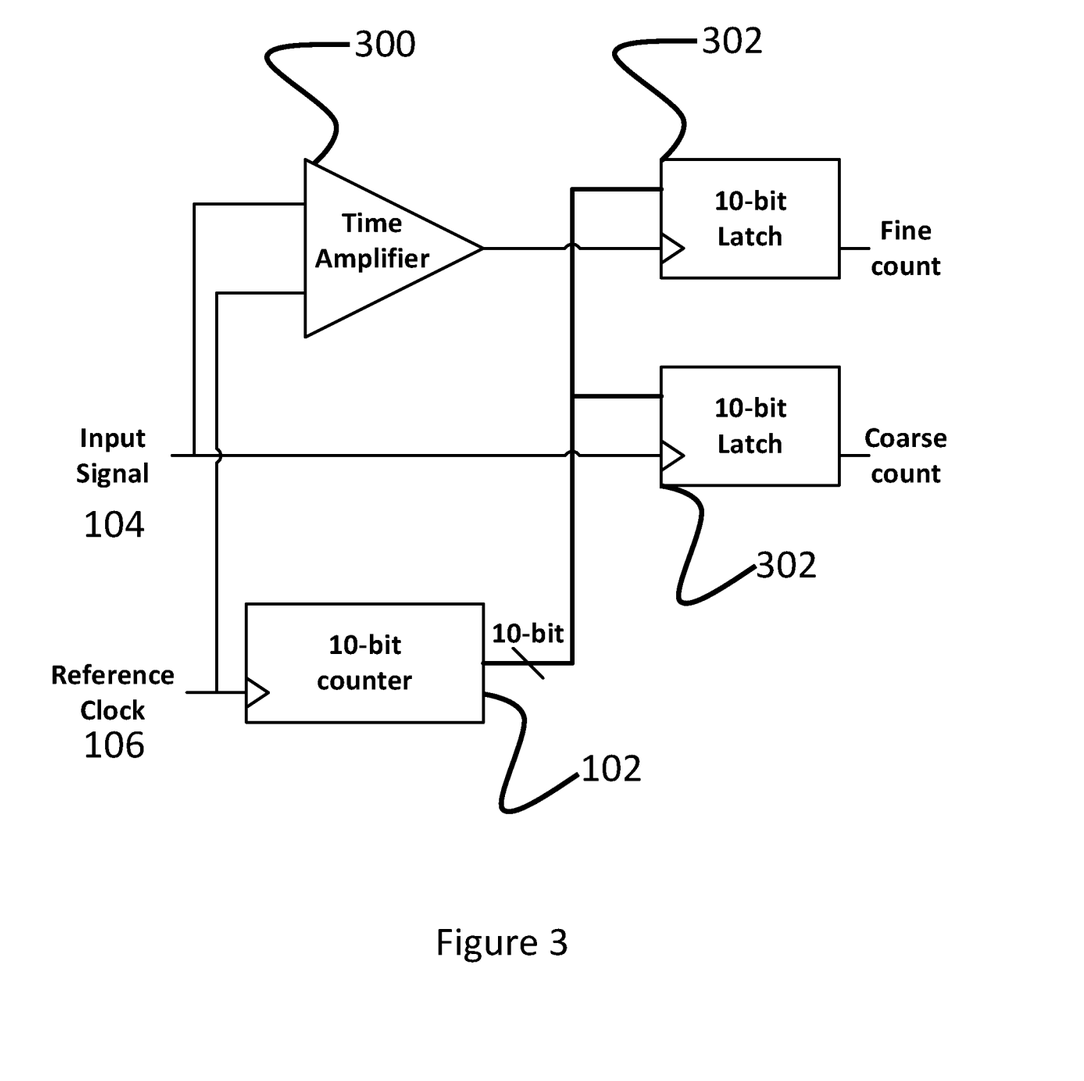
FIG. 3 is a schematic showing a time amplifier circuit, in accordance with embodiments of the present disclosure.
Figure 4:
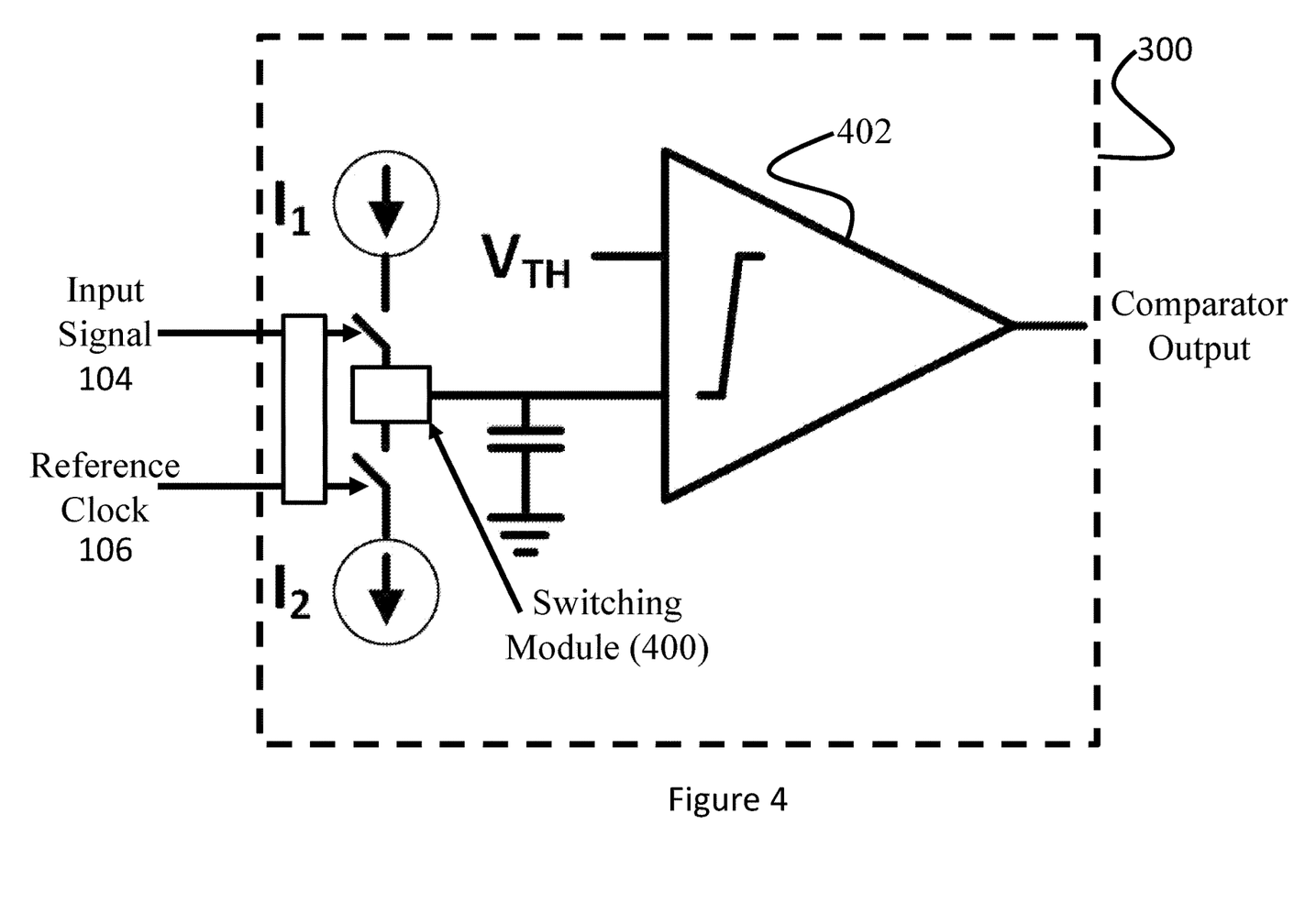
FIG. 4 is time amplifier schematic showing a more detailed view of the time amplifier of FIG. 3, in accordance with embodiments of the present disclosure.

A specific, exemplary embodiment is shown in FIG. 3, with a more detailed view of the Time Amplifier (TA) 300 shown therein being provided in FIG. 4. More specifically, FIG. 3 depicts a reference clock in electrical communication with a counter input and in further electrical communication with a first input of a TA; a second input of the TA is in electrical communication with an input signal. An output of the TA is further routed to a first input of a latch having a second input in electrical communication with an output of the counter, the latch being used for resolving a fine count by latching a counter value of the time-amplified difference between the event and reference clocks. Lastly, the system shown in FIG. 3 includes a second latch (hereinafter, a coarse latch), which uses the input signal and counter outputs as inputs.

In embodiments, a TA of a different design, as would be known to one of ordinary skill in the art, is used.

In embodiments, the counter is a 10-bit counter 102.

In embodiments, the latches are 10-bit latches 302.

In embodiments, the TA 300 comprises a comparator 402, current sources configured to charge and discharge the comparator (in embodiments, $I_2/I_1$, respectively), a switching module 400 configured to control the flow of current from the current sources ($I_2/I_1$) into the comparator using switches, and a threshold voltage ($V_{TH}$) input to the comparator 402, which is also herein referred to as a reference voltage ($V_{TH}$). In embodiments, the current sources ($V_{TH}$) comprise two current sources ($I_2/I_1$) controlled by a switching module 400 that controls switches configured to allow the flow of current from one or the other of the two current sources ($I_2/I_1$) into or out of the comparator 402, resulting in the current sources ($I_2/I_1$), respectively, alternately charging and discharging the comparator.

More specifically, in embodiments, the switching module 400, in response to the detection of an event (in embodiments, indicated by the switching module 400 receiving a predetermined input signal 104, which may be a signal over a certain voltage or a digital signal in the form of a 0 or 1) is configured to first discharge the comparator 402 by leaving open a switch between $I_1$ and an input node of the comparator, the switch hereinafter being referred to as the reference clock switch, while closing a switch between $I_2$ and the input node of the comparator, the switch hereinafter being referred to as the input signal switch, thereby allowing current to flow out of the comparator 402 input, discharging it. In embodiments, a counter value, in embodiments incremented by the reference clock 106, that is associated with the moment the comparator input begins being discharged by $I_2$ is latched and used to provide a coarse count, which may be considered a rough estimate of the time at which an event occurred. This switch configuration is herein referred to as the baseline or steady state configuration and results in a downward slew rate of voltage on the comparator input, which is dependent on $I_2$.

At a next reference clock 106 edge, the switching module 400 triggers the reference clock switch to close, allowing current to flow from $I_1$ into the comparator 402, and, substantially simultaneously, opens the input signal switch, causing the comparator 402 to cease discharging therethrough. This results in an upward slew rate of voltage on the comparator input, which is dependent on $I_1$. Once the voltage on the comparator input reaches the reference voltage ($V_{TH}$), the comparator 402 is configured to fire, in embodiments latching a second counter value that can be considered a fine count. Since the coarse event detection time is known, the amount of comparator 402 discharge is dependent on the size of $I_2$ and the time to the next reference clock 106 edge from the coarse event detection time, and the time for voltage on the comparator input to reach Vth depends on $I_1$, with the total gain of such a system described by the ratio of $I_2$ to $I_1$ (i.e. $I_2/I_1$), which is known, the distance of the coarse count value from a reference clock 106 edge can be very accurately extrapolated, allowing the timing of the event to be more accurately discerned than the reference clock 106 rate would otherwise allow.

Moreover, since the rate of charge by $I_1$ and discharge by $I_2$ can be adjusted, the gain of such a system may be adjusted over a very wide range, with high gain providing very accurate timestamping, but increasing dead time following the detection of an event and vice-versa. In embodiments, the gain is programmable. In embodiments, the gain is adjustable during use.

The behavior of the embodiment shown in FIGS. 3 and 4 can be characterized using Equation (1), below:

Complete calculation of when event happened $$T_{event} = T_{start} + count_{coarse} * period_{ref} + \left(\left(1 - \frac{(count_{fine} - count_{coarse})}{gain}\right) * period_{ref} - T_{static}\right) \quad \text{Equation (1)}$$

Figure 5:
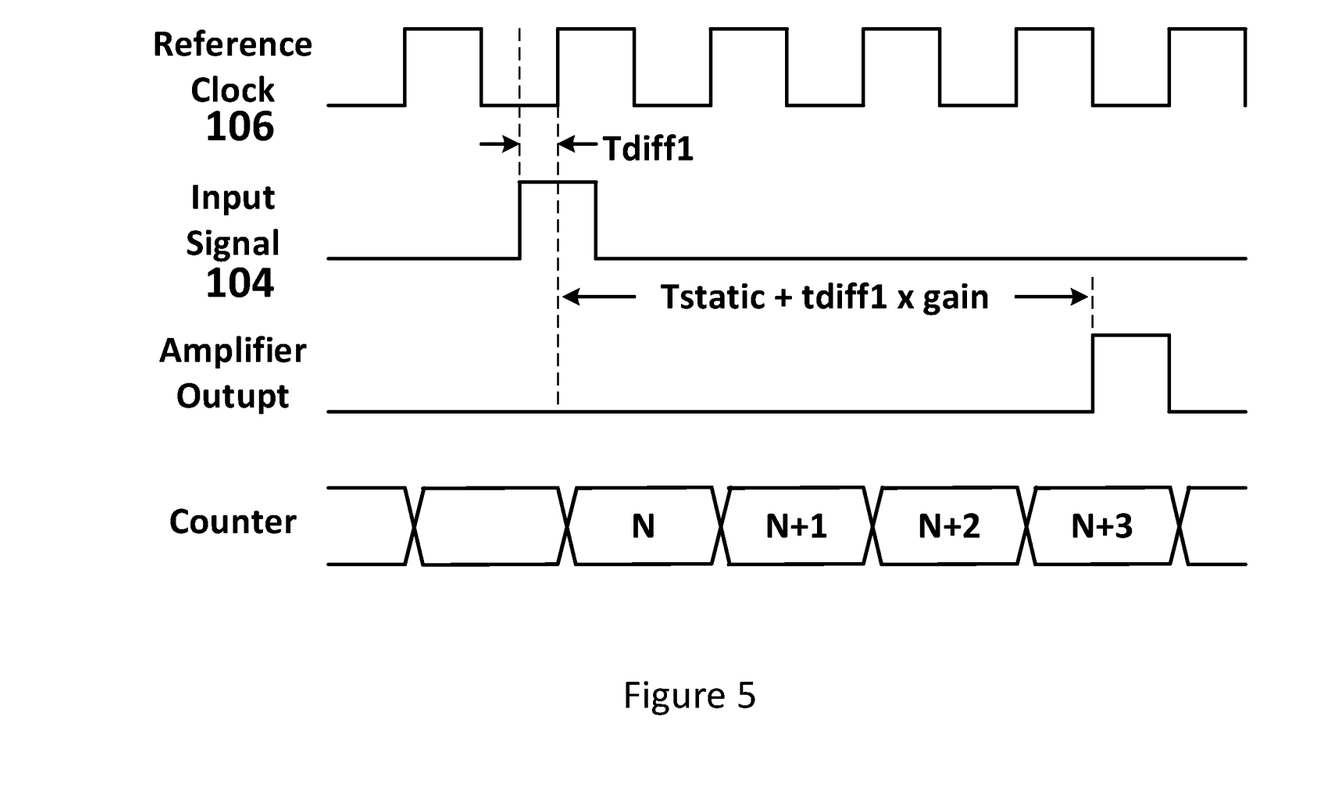
FIG. 5 is a graph describing the behavior of a pixel comprising the time amplifier circuit of FIGS. 3 and 4, in accordance with embodiments of the present disclosure.
Figure 6:
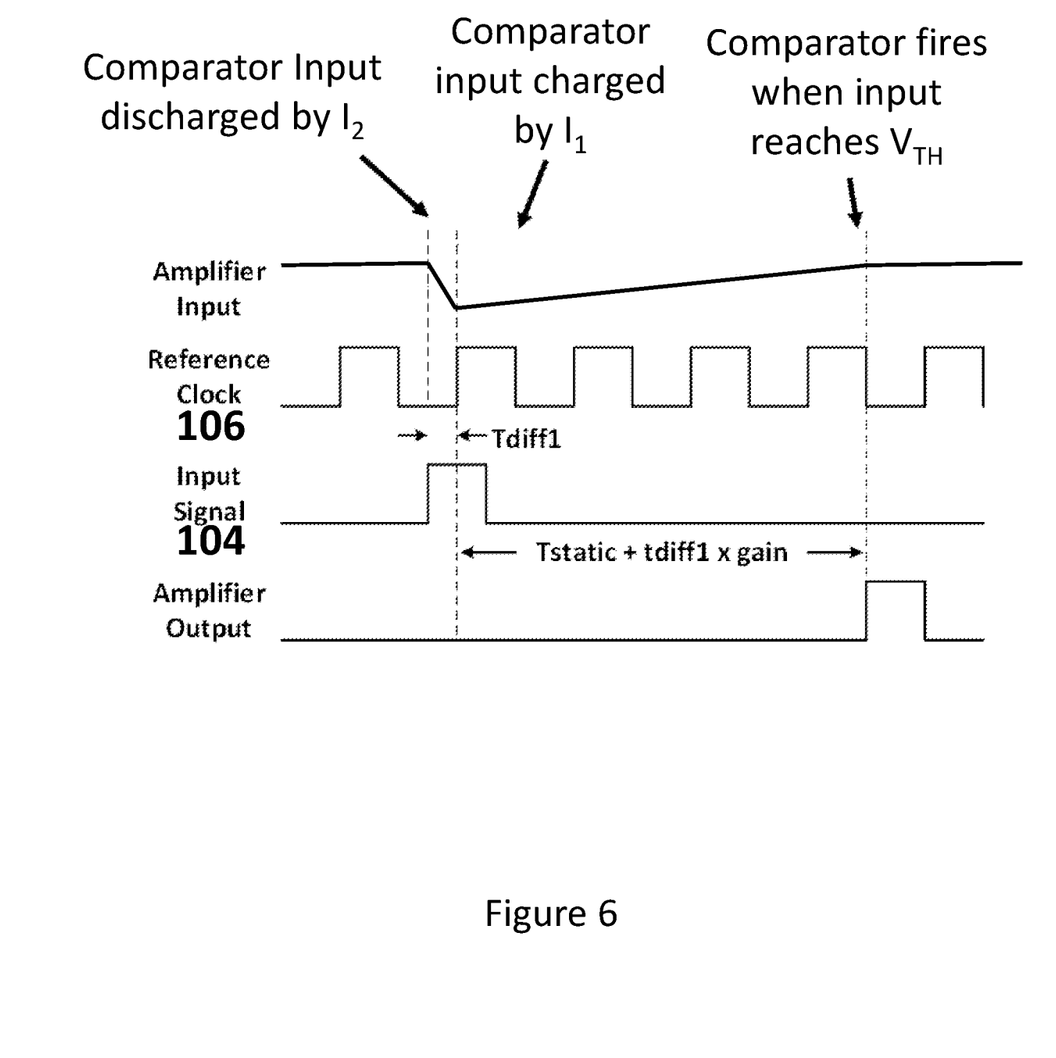
FIG. 6 is graph describing the behavior of the time amplifier circuit of FIGS. 3 and 4, in accordance with embodiments of the present disclosure.

This behavior is also graphically depicted in FIGS. 5 and 6. More specifically, Equation (1) provides the time difference between the edge of the reference clock 106 and the edge of the input signal 104. Even more specifically, the coarse count depicted in FIG. 5 would equal "N" and the fine count would equal (N+3)−N=3. FIG. 6 elaborates on the behavior depicted in FIG. 5, with reference to the TA 300 depicted in FIGS. 3 and 4.

More specifically, FIG. 5 shows: 1. When an input signal 104 is received by switching module 400, a latch 302 latches a counter value 102 (quick slew rate, discharge); 2. At a next reference clock 106 edge, switch $I_1$ closes and switch $I_2$ opens, leading to an increasing slew rate of voltage on the comparator input; 3. When voltage on the comparator input returns to steady state (i.e. $V_{th}$, threshold voltage, an output of the TA 300 fires; and 4. The output of the TA 300 latches a counter 102 value, which can be compared to the counter 102 value obtained in step 1 and used to extrapolate the time at which an event occurred more precisely than a reference clock 106 alone would be able to, as mathematically described below.

The gain of the TA 300 shown in FIG. 4 is defined by the ratio of $I_1$ and $I_2$, as shown in Equation (2), below:

$$\text{Gain} = \frac{I_2}{I_1} \quad \text{Equation (2)}$$

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. An imaging system, the imaging system comprising:
   a sensor array comprising at least one sensor; and
   a time amplifier configured to amplify a time difference between events energizing the at least one sensor;
   wherein the time amplifier comprises a comparator comprising an input, a reference voltage, and an output configured to fire upon a voltage at the input reaching the reference voltage, and a switching module disposed between said input of said comparator and a first current source configured to charge the comparator and a second current source configured to discharge the comparator,
   wherein the switching module is configured to alternately charge the comparator input using the first current source and to discharge the comparator input using the second current source, dependent on an input signal and reference clock inputs;
   wherein the input signal corresponds to activity on the at least one sensor in operative communication with said switching module; and further comprising:
   a reference clock in operative communication with said switching module;
   a counter comprising a counter input and a counter output, the counter input being in operative communication with said reference clock and configured to increment upon cycling of the reference clock;
   a first latch in operative communication with the counter output and with the input signal, said first latch being configured to latch a counter value associated with the receipt of a predetermined input signal by the first latch; and
   a second latch in operative communication with the counter output and with said output of said comparator,
said second latch being configured to latch the a counter value associated with the firing of the output of the comparator.

2. The imaging system of claim 1, wherein the switching module is configured to connect the second current source to the input of the comparator and disconnect the first current source from the input of the comparator upon the receipt of the predetermined input signal, thereby discharging the comparator.

3. The imaging system of claim 1, wherein the switching module, after connecting the second current source to the input of the comparator and disconnecting the first current source from the input of the comparator upon the receipt of the predetermined input signal, is further configured to connect the first current source to the input of the comparator and disconnect the second current source from the input of the comparator upon receiving a signal from the reference clock indicating the start of a new period.

4. The imaging system of claim 1, wherein the ratio of the first current source and the second source second current is programmable.

5. The imaging system of claim 1, wherein the current flow of the first current source and the second current source is programmable.

6. The imaging system of claim 1, wherein the current flow of the first current source and the second current source is adjustable.

7. The imaging system of claim 1, wherein the current flow of the first current source and the second current source is adjustable during use.

8. The imaging system of claim 1, wherein the array is a focal plane array.

9. The imaging system of claim 1, wherein the at least one sensor is a photodetector.

10. The imaging system of claim 1, wherein the at least one sensor is a pixel.

11. The imaging system of claim 1, wherein the at least one sensor is a Time-of-Flight detector.

12. The imaging system of claim 1, wherein the sensor array is a focal plane array.

13. The imaging system of claim 1, wherein the sensor array is configured to record a time at which or over which a sensor is triggered.

14. An imaging system, the imaging system comprising:
    a sensor array comprising at least one sensor;
    a time amplifier configured to amplify a time difference between events energizing the at least one sensor;
    an input signal corresponding to activity on the at least one sensor in operative communication with said switching module;
    a reference clock in operative communication with said switching module;
    a counter comprising a counter input and a counter output, the counter input being in operative communication with said reference clock and configured to increment upon cycling of the reference clock;
    a first latch in operative communication with the counter output and with the input signal, said first latch being configured to latch a counter value associated with the receipt of a predetermined input signal by the first latch; and
    a second latch in operative communication with the counter output and with an output of a comparator, said second latch being configured to latch a counter value associated with the firing of the output of the comparator, wherein the time amplifier comprises the comparator comprising an input, a reference voltage, and the output configured to fire upon a voltage at the input reaching the reference voltage, and a switching module disposed between said input of said comparator and a first current source configured to charge the comparator and a second current source configured to discharge the comparator, and wherein the switching module is configured to alternately charge the comparator input using the first current source and to discharge the comparator input using the second current source, dependent on the input signal and reference clock inputs.

15. The imaging system of claim 14, wherein the switching module is configured to connect the second current source to the input of the comparator and disconnect the first current source from the input of the comparator upon the receipt of the predetermined input signal, thereby discharging the comparator, and wherein the switching module, after connecting the second current source to the input of the comparator and disconnecting the first current source from the input of the comparator upon the receipt of the predetermined input signal, is further configured to connect the first current source to the input of the comparator and disconnect the second current source from the input of the comparator upon receiving a signal from the reference clock indicating the start of a new period.

16. An imaging system, the imaging system comprising:
a sensor array comprising at least one sensor;
a time amplifier configured to amplify a time difference between events energizing the at least one sensor;
an input signal corresponding to activity on the at least one sensor in operative communication with said switching module;
a reference clock in operative communication with said switching module;
a counter comprising a counter input and a counter output, the counter input being in operative communication with said reference clock and configured to increment upon cycling of the reference clock;
a first latch in operative communication with the counter output and with the input signal, said first latch being configured to latch a counter value associated with the receipt of a predetermined input signal by the first latch; and
a second latch in operative communication with the counter output and with an output of a comparator, said second latch being configured to latch a counter value associated with the firing of the output of the comparator, wherein the time amplifier comprises the comparator comprising an input, a reference voltage, and the output configured to fire upon a voltage at the input reaching the reference voltage, and a switching module disposed between said input of said comparator and a first current source configured to charge the comparator and a second current source configured to discharge the comparator, wherein the switching module is configured to alternately charge the comparator input using the first current source and to discharge the comparator input using the second current source, dependent on the input signal and reference clock inputs, wherein the switching module is configured to connect the second current source to the input of the comparator and disconnect the first current source from the input of the comparator upon the receipt of the predetermined input signal, thereby discharging the comparator, and wherein the switching module, after connecting the second current source to the input of the comparator and disconnecting the first current source from the input of the comparator upon the receipt of the predetermined input signal, is further configured to connect the first current source to the input of the comparator and disconnect the second current source from the input of the comparator upon receiving a signal from the reference clock indicating the start of a new period.

* * * * *